UNITED STATES PATENT OFFICE.

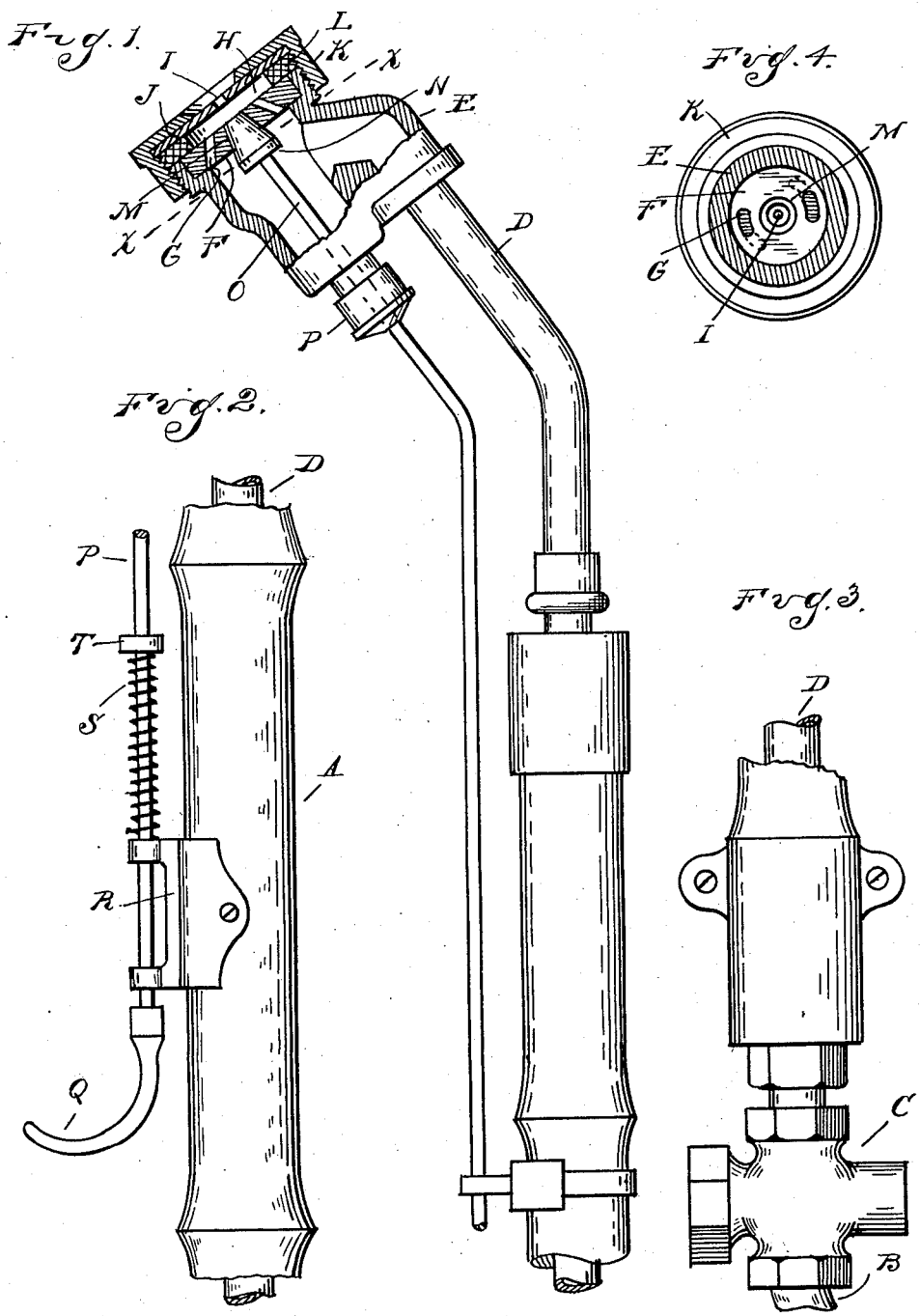

HENRY H. HARDIE, OF HUDSON, MICHIGAN, ASSIGNOR TO THE HARDIE MANUFACTURING COMPANY, OF HUDSON, MICHIGAN, A CORPORATION OF MICHIGAN.

TREE-SPRAYING DEVICE.

1,079,335.  Specification of Letters Patent.  Patented Nov. 25, 1913.

Application filed March 6, 1911. Serial No. 612,662.

*To all whom it may concern:*

Be it known that I, HENRY H. HARDIE, a citizen of the United States of America, residing at Hudson, in the county of Lenawee and State of Michigan, have invented certain new and useful Improvements in Tree-Spraying Devices, of which the following is a specification, reference being had therein to the accompanying drawings.

The invention relates to apparatus for the spraying of plants and trees to destroy insect life, etc., and the invention consists in the peculiar construction of an extension nozzle, and the means employed for controlling the spray therefrom as hereinafter set forth.

In the drawings,—Figures 1, 2, and 3 are elevations respectively of the upper end, intermediate section and lower end of the extension nozzle, the upper end being partially in section; Fig. 4 is a cross section on line $x$—$x$ Fig. 1.

My improvement is adapted for use with any suitable construction of liquid pumping apparatus (not shown) by which the liquid for forming the spray is delivered to the discharge nozzle. It is desirable to discharge the liquid in the form of a fine spray, as this more uniformly distributes it over the leaves and branches of the plant or tree. Such a fine spray can be produced in various ways but it is difficult to obtain a fine spray that will carry more than a short distance from the discharge end of the nozzle. Thus, while it is possible to effectively spray the lower branches with such a device, the higher branches can only be reached by a longer stream. If on the other hand, a construction of nozzle is used for delivering a longer stream it is not as effective for the treatment of the lower branches. My improvement is designed to overcome these difficulties by a construction of nozzle capable of adjustment for either a fine spreading spray discharge which will only carry a short distance, or a longer stream where needed.

Another feature is the means of control by which the operator standing on the ground can adjust the nozzle and produce any degree of variation from the short spreading discharge to the longer more concentrated discharge, according to the requirements of the work.

In detail, A is a tubular holder or handle preferably of bamboo rod, B is a coupling at the lower end of the rod for connecting the same with the hose or conduit (not shown) through which the liquid is delivered, and C is a valve for turning on or off the liquid.

D is a discharge pipe extending from the valve C through the bamboo pole to the nozzle E and preferably bent so as to direct the discharge from the nozzle obliquely.

For producing a fine spreading spray, a centrifugal discharge is obtained preferably by passing the liquid through a disk F having a circular series of inclined ports G therethrough discharging into a chamber H having a central discharge port I formed in a thin disk J. The disks F and J are secured to the nozzle preferably by the detachable screw cap K, and a gasket L is employed for separating the disks to form the chamber H, and also for preventing leakage through the joint in the cap. Thus when the liquid is forced into the nozzle and through the inclined ports G it will be caused to rapidly rotate in the chamber H and when discharged through the port I will spread into a fine spray. In addition to the inclined ports G the disk F is provided with a central conical port M in alinement with the port I, and a conical plug N is arranged to seat in the port M. The plug N is secured to a rod O which passing out through a packing gland P extends downward adjacent to the pole and to a point near the lower end thereof where it is provided with an operating handle Q. A guide R slidably secures the lower end of the rod O and a spring S abutting against said guide, and a collar T on the rod serves to normally hold the plug N in contact with its seat.

With the construction as described in operation, the nozzle is normally adjusted to discharge the liquid through the inclined ports G so as to produce the centrifugal spray, and this adjustment is the one which is used for the larger part of the work. When however, it is necessary to obtain a longer stream the operator by drawing downward the hook handle Q will withdraw the plug N from its seat, permitting the direct discharge of the liquid through the port M to the port I. This adjustment does not cut off the liquid from the inclined ports G, but if the port M is widely opened it will provide a path of lower resistance for the liquid, and the greater part will be discharged therethrough, thus cutting out the centrifugal discharge. On the other hand, if the plug is only partly withdrawn from its seat a limited amount of the liquid will pass through the port M which will be combined with the rotating liquid in the chamber H producing a spray longer than with the normal action, but still of the spreading character. A further opening of the port M will produce a further modified stream, and thus by properly manipulating the handle Q any effect desired may be obtained.

My improved apparatus is particularly designed for use with poles or extension nozzles of considerable length as for instance from six to twelve feet. With these long rods the means for varying the character of the spray is particularly useful and enables the operator to perform work that would be otherwise difficult or impossible.

What I claim as my invention is:

1. In a spraying apparatus, the combination with a member forming an extended nozzle, of a chambered fitting at the upper end of said member, a disk in said chambered fitting having obliquely arranged ports therethrough for causing the rotation of the liquid, a centrally apertured disk through which the rotating liquid is discharged, a port through the first mentioned disk in alinement with said central port, and means for variably restricting the last mentioned port.

2. In a spraying apparatus, the combination with a member forming an extended nozzle, of a chambered fitting at the upper end of said member arranged to discharge the liquid in an oblique direction, means for causing the rotation of the liquid discharge from said fitting, a port in said fitting for discharging a non-rotating stream, a plug for normally closing said port, and a rod for actuating said plug extending to the lower end of said member and operable therefrom.

3. In a liquid spraying apparatus, a member forming an extended nozzle, a fitting at the upper end of said member comprising a chambered casing, an apertured disk forming the discharge from said casing, a disk within said casing parallel to said apertured disk having inclined ports therethrough, and a centrally tapering port in alinement with the discharge port, a tapering plug normally seated in said tapering port, a rod connected to said plug and extending out through said fitting and downward to the lower end of said member, a spring for normally holding said plug to its seat, and a handle for actuating said rod to withdraw the plug from its seat.

4. In a spraying apparatus, the combination with a member forming an extended nozzle, of a chambered fitting at the upper end of said member arranged to discharge the liquid in an oblique direction, said chambered fitting being provided with a continuously open centrifugal discharge means, a port for discharging a non-rotating stream, a valve normally closing said port, and means extending to the lower end of said member for adjusting said valve from its seat in a direction substantially parallel to the direction of discharge to variably change the character of the spray.

5. In a spraying apparatus, a liquid discharge nozzle comprising a chambered casing, a disk in said chambered casing having obliquely arranged ports therethrough for causing the rotation of the liquid, a centrally apertured disk through which the rotating liquid is discharged, a port through the first-mentioned disk in alinement with said central port, and means for variably restricting the last-mentioned port.

6. In a spraying apparatus, a liquid discharge nozzle comprising a chambered casing, an apertured disk forming the discharge from said casing, a disk within said casing parallel to said apertured disk having inclined ports therethrough and a central tapered port in alinement with the discharge port, a tapering plug normally seated in said tapering port, a spring for normally holding said plug to its seat, and means for variably adjusting said plug against the tension of said spring.

In testimony whereof I affix my signature in presence of two witnesses.

HENRY H. HARDIE.

Witnesses:
M. M. KELLEY,
CHAS. J. PROST.